July 24, 1934.  A. O. SCHAEFER  1,967,974
WINDOW VENTILATOR OR DRAFT SHIELD
Filed Nov. 12, 1932
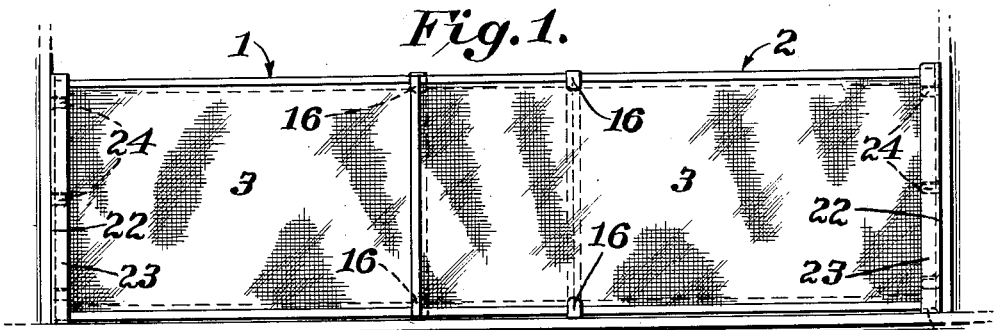
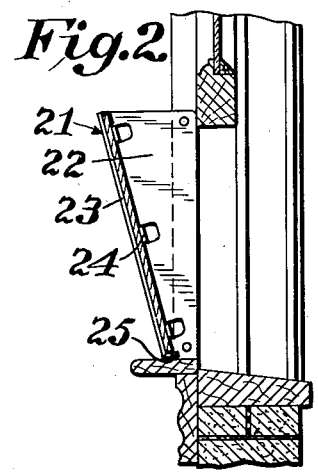
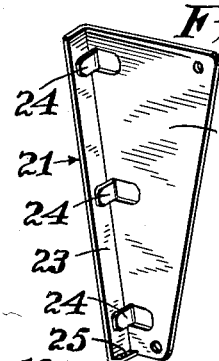
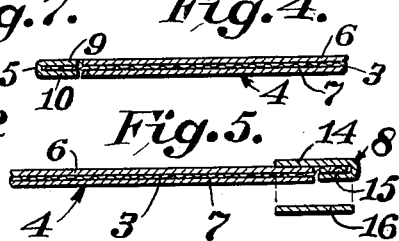
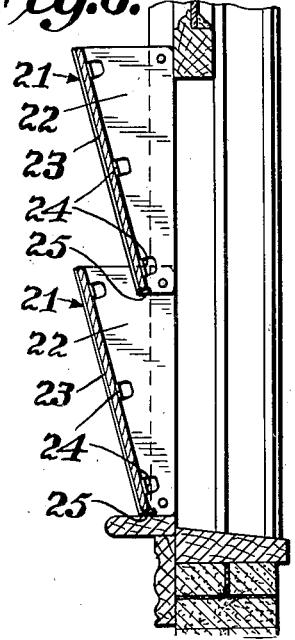
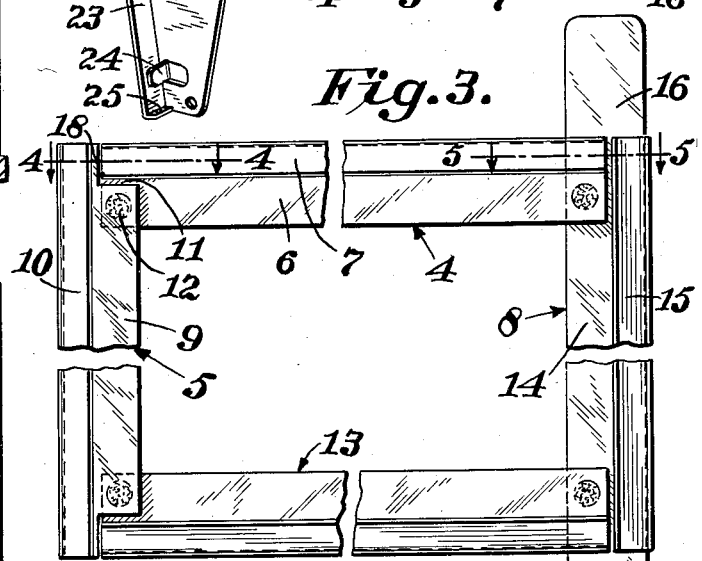
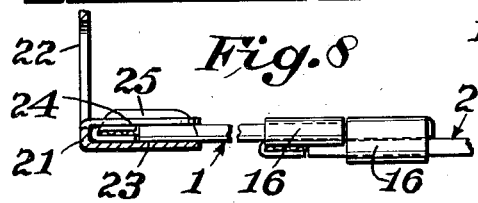
Inventor:
Adolph O. Schaefer;
By Parker Cook
Attorney.

Patented July 24, 1934

1,967,974

UNITED STATES PATENT OFFICE 1,967,974

WINDOW VENTILATOR OR DRAFT SHIELD

Adolph O. Schaefer, Brooklyn, N. Y., assignor to Atlantic Service Company, Inc., Brooklyn, N. Y., a corporation of New York Application November 12, 1932, Serial No. 642,433

6 Claims. (Cl. 98—99)

My invention relates to new and useful improvements in window ventilators or draft shields, and has for an object to provide a shield wherein the frame is made of a relatively thin metal, so that the same may be crimped about the edges of the screening or other material that forms the body of the ventilator.

Still another object of the invention is to provide a ventilator or draft deflector consisting of two sliding frames, so that the screen or deflector may be extended to properly fit the window to which it is to be applied, the joints at the outer corners of the frames of the screen being so formed that the screen may be easily fitted in the brackets that are, of course, to be attached to the window.

Still another object of the invention is to provide a ventilator or draft shield that is exceedingly strong in construction, presenting relatively smooth surfaces at the joints of the frame and, at the same time, capable of being quickly and cheaply assembled;

Still another object of the invention is to so design certain corner constructions of the frame and to so construct the brackets that the shield or screen may be quickly placed in position or withdrawn from the brackets and, at the same time, when once in place will not rattle if there is a draft through the window.

Still another object of the invention is to provide a frame wherein the several parts of the same are so cut as to provide smooth surfaces at the joints and also to so construct the frame that it may be quickly spot-welded at the joints to thus provide a strong and economical construction.

Still another object of the invention is to provide a ventilator wherein the joints of the frame are made up in a new and novel manner and the brackets so arranged as to allow the ventilators to be used in multiple.

Still another object of the invention is to provide an efficient means for holding the slidable frames to each other that will be exceedingly simple and, at the same time, very efficient.

With these and other objects in view, the invention consists in certain new and novel arrangements and combination of parts, as will be hereinafter more fully described and pointed out in the claims.

Referring now to the drawing showing a preferred embodiment of the invention,

Fig. 1 is a front view of the ventilator or draft guard fitted within its brackets, which are attached to a window frame;

Fig. 2 is a transverse sectional view thereof;

Fig. 3 is an enlarged plan view of one of the frames before the screen (flexible glass) is inserted and the flanges are rolled down;

Fig. 4 is an enlarged section on the line 4—4 of Fig. 3;

Fig. 5 is a similar view to Fig. 4, taken on the line 5—5 of Fig. 3;

Fig. 6 is a view of the ventilator or draft guard used in multiple;

Fig. 7 is a perspective of one of the brackets;

Fig. 8 is an enlarged cross sectional view showing the guard engaging one of the tongues of the bracket.

Referring now more particularly to the several views, and for the moment to Fig. 1, there is shown the extensible draft guard or ventilator as placed within its brackets, which latter are secured in a window frame.

The guard or ventilator consists of two similar rectangular frames 1 and 2, which frames have clamped therein the flexible glass 3.

This "flexible glass", it will be understood, consists of a metal screening which is covered with a fine layer of glass, thus filling the interstices of the screening, preventing any air from blowing therethrough, but allowing the light to pass.

It will be understood, at the outset, that although the device in the present instance is primarily a draft guard, that is, allowing the air to strike the guard and be deflected upwardly, the frames might be filled with ordinary screening and the device used strictly as a ventilator.

It might also be mentioned that throughout the specification, the two sliding members that make up the device will be hereinafter spoken of as panels, and it will also be understood that the two panels are exact duplicates, with the exception that the little clamping tongues on the one panel are reversed with relation to the clamping tongues on the other panel.

Referring now more particularly to Fig. 3, showing the manner in which the corners of the frame are joined and the manner in which the slidable panels are held together, reference is made to the top-piece 4 and the side-piece 5 of the frame.

In these draft deflectors or ventilators, the height of the deflector is always standard, but the length of the panels may be varied to suit requirements.

The top-piece 4, therefore, may be of any desired length and consists of a metal strip having the body 6 and the bent-over flange 7, which is left in its partly bent condition until later rolled to clamp the screening (flexible glass).

Now the side-pieces 5 and 8 of each panel are differently constructed, and the side-piece 5 will first be described, and specifically its upper corner.

It will be seen that the side-piece 5 consists of a relatively thin metal strip having the body 9 and the flange 10, which is about half the width of the body 9, and this flange 10 extends the entire length of the strip. However, one corner of the body 9 is cut-out, as at 11, the depth of the cut-out portion being co-extensive with the width of the flange of the top-piece 4.

The body 9 of the side-piece 5 is then laid on the end of the top-piece 4 and spot-welded, as at 12, to thus form a rigid and substantially integral structure at this point.

The lower end of the side-piece 5 is formed in exactly the same manner and welded to the bottom-piece 13 of the frame.

Referring for the moment to the opposite side-piece 8 of the frame, and specifically to the upper corner thereof, there is seen a similar strip of metal having the body 14 and the bent-over flange 15, but in this instance the body 6 of the top-piece is laid on, rather than under, the body 14 of the side-piece 8.

Now there is formed a tongue 16 on the side-piece 8, and it will be noticed that this tongue 16 is simply a continuation of the body 14 and extends above the upper edge of the metal flange 15 and above the plane of the horizontal or upper strip of the frame.

The lower end of the side-piece 8 and its connection with the bottom-piece 13 of the frame corresponds exactly with the structure just above-mentioned.

It will also be understood that the two frames that make up the guard are identical, with but one exception, and that is the tongues 16 in the frame 1 extend forwardly and toward each other (Fig. 1), whereas the tongues on the other frame 2 extend rearwardly and toward each other, so that the two panels that make up the draft guard or ventilator are slidably interlocked from opposite sides.

After the frame has been made up of the top, bottom and two side-pieces, as heretofore mentioned, a layer of screening, filled with glass, is cut to size and placed under the respective flanges of the frame, and the flanges then rolled or pressed or, in other words, crimped about the marginal edges of the screen.

Now referring again for the moment to Fig. 3, it will be seen that in the joint, that is, where the side-piece 5 is joined to the top-piece 4, the flange 7 may be pressed or rolled, while the metal at the corner 18 will be forced down in the cut-out portion 11. In other words, there will be only two layers of metal through the joint at this point, that is, through the flange 7 and through the body 6. Thus, when the flange 10 of the side-piece 5 is pressed, it will lie substantially flush with the now-pressed flange 7.

The opposite side of this frame will have the top tongue 16 bent forwardly and then downwardly to engage the top strip of the adjacent panel of the deflector and, in the same way, the lower corner will have the tongue bent forwardly and then upwardly.

The other panel of the guard is crimped or rolled in the same manner, but the tongues folded over in the opposite direction.

Now it is very desirable to have the side-pieces of the frame, that is, the two outer sides of the assembled panels, relatively flat at the corners, for the reason that these two outer sides of the guard or deflector are to fit within tongued brackets 21. The brackets are made up in rights and lefts, but are otherwise identical.

Each bracket consists of a substantially triangular metal body 22 having the marginal flange 23 extending at right angles therefrom, while spaced slightly from this flange are the tongues 24, which are struck from the body and in a plane parallel with the flange 23. The lower end of the flange 23 is then bent inwardly to form a ledge or bracket 25 for the panel to rest on after the same is placed within the bracket.

By placing this little tongue or ledge on the bottom of the brackets, two of the deflectors may be used in multiple, that is, one above the other, if so desired (see Fig. 6).

Of course, to assemble the panels, the free end, that is, the end without the tongues, of the one panel is slipped within the tongues of the other panel, and the panels then extended. There is no possibility of the panels being disengaged from each other, because if the panels are now moved to their full length, the tongues will engage to prevent the panels from being pulled apart.

From the foregoing, it will be seen that I have devised a screen or dust guard or draft deflector wherein the frame consists of metal strips having their outer corners relatively smooth on their one surface, so that as they are moved up and down between the tongues of the brackets the panels will slide easily without catching on the said tongues.

Furthermore, by providing the tongues as shown on the panels and having them formed integral with certain of the side strips, a cheap but efficient means is provided for slidingly holding the said panels.

Also, after the screening or flexible glass is once crimped in place, there is no danger of it pulling away from the same.

Lastly, the frame is one wherein the parts of the same may be spot-welded and the flanges rolled down, so that the cost of production of the screen is relatively small.

Having thus described my invention, what I claim as new and desire to secure by Letters Patent is:—

1. A draft guard or ventilator including two slidable panels, each panel consisting of a frame composed of metal side-pieces and a top and a bottom-piece, the said pieces spot-welded to form substantially an integral structure, one of the side-pieces of the frame having tongues at its upper and lower ends, the said tongues bent outwardly from the frame and toward each other, the tongues of one panel bent to the front of the panel while the tongues of the other panel extending to the rear thereof, the remaining side-piece of each frame having its upper and lower ends cut-out inwardly of one of its edges whereby the top and bottom-pieces where they join the side-piece may lie flush on their one surface with the outer surface of said side-piece, and the aforementioned tongues of said panels holding the two panels in extensible relation to each other.

2. A metal frame for dust guards or ventilators consisting of four flanged strips forming side-pieces and a top and a bottom-piece, one side-piece having a cut-out portion at each of its ends inwardly of one of its edges, the other side-piece having protruding tongues at its ends, said top and bottom-pieces positioned on the said piece having the cut-away corners and positioned under the side-piece having the tongues, and the four corners spot-welded, the tongues being bent toward each other and extending throughout their greater length parallel to their side-piece.

3. A metal frame for a ventilator or dust guard comprising a top and a bottom-piece and two side-pieces, the ends of one side-piece being cut away at their corners inwardly of one of its edges whereby one of the ends of the top-piece may be fitted therein, the other side-piece having tongues at its ends, the tongues extending toward each other and spaced slightly from the said side-piece whereby a similar panel may be slipped beneath said tongues, rolled flanges on the side-pieces and the top and bottom-pieces, and a body crimped within the frame, the outer surface of the side-pieces presenting a plane surface where the joints occur between the side-pieces and the top and the bottom-pieces.

4. A thin metal frame for ventilators or draft guards comprising a flanged metal strip forming a side-piece, the corners of the side-piece cut away inwardly of one edge thereof coincident with the flanged portion, flanged top and bottom-pieces positioned on said side-piece and spot-welded thereto, the flanges of the top and bottom-pieces lying flush with the flange of the side-piece, the remaining side-piece formed of a flanged strip and having tongues at the outer ends thereof, said side-piece placed on the said top and bottom-pieces and spot-welded thereto, the said tongues extending toward each other and spaced from said side-piece, and a screening fitted within said frame and crimped beneath the said flanges.

5. In a draft guard or ventilator, a panel comprising a channeled frame characterized by side-pieces, a top-piece and a bottom-piece, one of said side-pieces having its ends on one face thereof formed with a cut-away portion inwardly of an edge of said side-piece, the top and bottom-pieces extending to the cut-away portions and terminating inwardly of said edge, the other side-piece having its ends reversely bent over the top and bottom-pieces to form tongues oppositely projecting in parallel spaced relationship to the frame.

6. An extensible guard or ventilator consisting of two duplicate panels, each panel comprising a channeled frame characterized by side-pieces, a top-piece and a bottom-piece, one of said side-pieces having its ends on one face thereof formed with a cut-away portion inwardly of an edge of said side-piece, the top and bottom-pieces extending to the cut-away portions and terminating inwardly of said edge, the other side-piece having its ends reversely bent over the top and bottom-pieces to form tongues oppositely projecting in parallel spaced relationship to the frame, a screening clamped within the frame of each panel, and the tongues of said panels holding the latter in extensible relationship to each other.

ADOLPH O. SCHAEFER.